US007689901B2

(12) United States Patent
Rising, III et al.

(10) Patent No.: US 7,689,901 B2
(45) Date of Patent: Mar. 30, 2010

(54) MULTIPLE UPDATES TO CONTENT DESCRIPTIONS USING A SINGLE COMMAND

(75) Inventors: Hawley K. Rising, III, San Jose, CA (US); Ali Tabatabai, Beaverton, OR (US); Mohammed Z. Visharam, Santa Clara, CA (US); Toby Walker, Fujisawa (JP)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 2511 days.

(21) Appl. No.: 10/086,275

(22) Filed: Feb. 28, 2002

(65) Prior Publication Data

US 2002/0170070 A1 Nov. 14, 2002

Related U.S. Application Data

(60) Provisional application No. 60/272,796, filed on Mar. 1, 2001, provisional application No. 60/305,009, filed on Jul. 11, 2001.

(51) Int. Cl.
G06F 17/00 (2006.01)
G06F 17/30 (2006.01)

(52) U.S. Cl. ................ 715/234; 715/202; 715/204; 715/205; 715/255; 707/3; 707/101; 707/104.1

(58) Field of Classification Search ......... 715/200–205, 715/234, 273, 276, 713, 719, 723, 727, 737, 715/760, 853, 226, 854; 707/1, 101, 102, 707/104.1, E17.009
See application file for complete search history.

(56) References Cited

U.S. PATENT DOCUMENTS

| 5,325,449 | A | 6/1994 | Burt et al. |
| 5,495,292 | A | 2/1996 | Zhang et al. |
| 5,579,471 | A | 11/1996 | Barber et al. |
| 6,236,395 | B1 | 5/2001 | Sezan et al. |
| 6,345,279 | B1 | 2/2002 | Li et al. |

(Continued)

OTHER PUBLICATIONS

Seyrat et al., "Text of ISO/IEC CD 15938-1 Information Technology—Multimedia Content Description Interface—Part 1 Systems", International Organization for Standardization Organisation Internationale De Normalisation ISO/IEC JTC1/SC29/WG11, Oct. 2000.*

(Continued)

*Primary Examiner*—Laurie Ries
*Assistant Examiner*—Maikhanh Nguyen
(74) *Attorney, Agent, or Firm*—Blakely, Sokoloff, Taylor & Zafman LLP (57) ABSTRACT

Updates to a content description represented as a tree are contained in a series of fragment update units. Each fragment update unit includes an update command and a navigation path, and may include a fragment payload depending on the update command. The update command is applied to a set of nodes in the tree that are selected using the navigation path. The fragment payload may contain a fragment, a fragment reference, or an attribute. The update command may be an add, delete or replace command. More than one fragment payload may be present in the fragment update unit, with each fragment payload applied to a different one of the nodes from the set selected by the navigation path.

23 Claims, 7 Drawing Sheets

U.S. PATENT DOCUMENTS

| | | | |
|---|---|---|---|
| 6,377,957 | B1 | 4/2002 | Jeyaraman |
| 6,411,724 | B1 | 6/2002 | Vaithilingam et al. |
| 6,490,370 | B1 | 12/2002 | Krasinski et al. |
| 6,492,998 | B1 | 12/2002 | Kim et al. |
| 6,564,263 | B1 | 5/2003 | Bergman et al. |
| 6,593,936 | B1 | 7/2003 | Huang et al. |
| 6,748,382 | B1 | 6/2004 | Mohan et al. |
| 6,751,623 | B1 | 6/2004 | Basso et al. |
| 6,772,180 | B1 | 8/2004 | Li et al. |
| 6,847,980 | B1 | 1/2005 | Benitez et al. |
| 6,966,027 | B1 | 11/2005 | Krasinski |
| 6,995,765 | B2 | 2/2006 | Boudier |
| 7,143,434 | B1 | 11/2006 | Paek et al. |
| 7,185,049 | B1 | 2/2007 | Benitez et al. |
| 7,233,953 | B2 * | 6/2007 | Heuer et al. ................ 707/100 |
| 2002/0157112 | A1 | 10/2002 | Kuhn |
| 2003/0009472 | A1 * | 1/2003 | Azami et al. ................ 707/101 |
| 2003/0093790 | A1 | 5/2003 | Logan et al. |
| 2004/0139393 | A1 * | 7/2004 | Heuer et al. ................ 715/513 |

OTHER PUBLICATIONS

M. Wollborn, "Appllication Specific Extension Code for Binary MPEG-7 Data", International Organization for Standardization ISO/IEC JTC1/SC29/WG11, Jan. 2001.*

J. Hunter, "MPEG-7 Behind the Scenes", D-Lib Maganize, vol. 5, No. 9, Sep. 1999, pp. 1-13.*

O. Avaro et al., "MPEG-7 Systems: Overview", IEEE Transaction on Circuits and Systems for Video Technology, vol. 11, No. 6, Jun. 2001, pp. 760-764.*

Hu, et al., "Multimedia Description Framework (MDF) for Content Description of Audio/Video Documents", School of EEE, Nanyang Technological University, 1999, pp. 67-75.

Eric Rehm, "Representing Internet Streaming Media Metadata Using MPEG-7 Multimedia Descriptions Schemes", Singingfish.com, 2000, pp. 93-98.

W3C, XML Path Language (Xpath), Version 1.0, W3C Recommendation, Nov. 16, 1999, James Clark & Steve DeRose, 31 pages.

International Organisation for Standardisation Organisation Internationale De Normalisation, ISO/IEC JTC1/SC29/WG11, Coding of Moving Pictures and Associated Audio Information, ISO/IEC JTC1/SC29/WG11, MPEG01/M7434, Jul. 2001, Shuichi Watanabe & Yasuaki Tokumo, 5 pages.

International Organisation for Standardisation Organisation Internationale De Normalisation, ISO/IEC JTC1/SC29/WG11, Coding of Moving Pictures and Associated Audio Information, ISO/IEC JTC1/SC29/WG11, MPEG01/M7029, Mar. 2001, Shuichi Watanabe & Yasuaki Tokumo, 3 pages.

* cited by examiner

MULTIPLE UPDATES TO CONTENT DESCRIPTIONS USING A SINGLE COMMAND

RELATED APPLICATIONS

This application is related to and claims the benefit of U.S. Provisional patent applications 60/272,796, filed Mar. 1, 2001 and 60/305,009, filed Jul. 11, 2001, which are incorporated by reference herein.

FIELD OF THE INVENTION

This invention relates generally to the transmission of digital multimedia content, and more particularly to updating multimedia content descriptions for digital multimedia content.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright © 2001, Sony Electronics, Inc., All Rights Reserved.

BACKGROUND OF THE INVENTION

Digital multimedia information is becoming widely distributed through broadcast transmission, such as digital television signals, and interactive transmission, such as the Internet. The information may be in still images, audio feeds, or video data streams. However, the availability of such a large volume of information has led to difficulties in identifying content that is of particular interest to a user. Various organizations have attempted to deal with the problem by providing a description of the information that can be used to search, filter and/or browse to locate particular content. The Moving Picture Experts Group (MPEG) has promulgated a Multimedia Content Description Interface standard, commonly referred to as MPEG-7 to standardize the content descriptions for multimedia information. In contrast to preceding MPEG standards such as MPEG-1 and MPEG-2, which define coded representations of audio-visual content, an MPEG-7 content description describes the structure and semantics of the content and not the content itself.

Using a movie as an example, a corresponding MPEG-7 content description would contain "descriptors" (D), which are components that describe the features of the movie, such as scenes, titles for scenes, shots within scenes, time, color, shape, motion, and audio information for the shots. The content description would also contain one or more "description schemes" (DS), which are components that describe relationships among two or more descriptors and/or description schemes, such as a shot description scheme that relates together the features of a shot. A description scheme can also describe the relationship among other description schemes, and between description schemes and descriptors, such as a scene description scheme that relates the different shots in a scene, and relates the title feature of the scene to the shots.

MPEG-7 uses a Data Definition Language (DDL) that specifies the language for defining the standard set of description tools (DS, D) and for defining new description tools and provides a core set of descriptors and description schemes. The DDL definitions for a set of descriptors and description schemes are organized into "schemas" for different classes of content. The DDL definition for each descriptor in a schema specifies the syntax and semantics of the corresponding feature. The DDL definition for each description scheme in a schema specifies the structure and semantics of the relationships among its children components, the descriptors and description schemes. The DDL may be used to modify and extend the existing description schemes and create new description schemes and descriptors.

The MPEG-7 DDL is based on XML (extensible markup language) and the XML Schema standards. The descriptors, description schemes, semantics, syntax, and structures are represented with XML elements and XML attributes. Some of the XML elements and attributes may be optional.

The MPEG-7 content description for a particular piece of content is defined as an instance of an MPEG-7 schema; that is, it contains data that adheres to the syntax and semantics defined in the schema. The content description is encoded in an "instance document" that references the appropriate schema. The instance document contains a set of "descriptor values" for the required elements and attributes defined in the schema, and for any necessary optional elements and/or attributes. For example, some of the descriptor values for a particular movie might specify that the movie has three scenes, with scene one having six shots, scene two having five shots, and scene three having ten shots. The instance document may be encoded in a textual format using XML, or in a binary format, such as the binary format specified for MPEG-7 data, known as "BiM," or a mixture of the two formats.

The instance document is transmitted through a communication channel, such as a computer network, to another system that uses the content description data contained in the instance document to search, filter and/or browse the corresponding content data stream. Typically, the instance document is compressed for faster transmission. An encoder component may both encode and compress the instance document or the functions may be performed by different components. Furthermore, the instance document may be generated by one system and subsequently transmitted by a different system. A corresponding decoder component at the receiving system uses the referenced schema to decode the instance document. The schema may be transmitted to the decoder separately from the instance document, as part of the same transmission, or obtained by the receiving system from another source. Alternatively, certain schemas may be incorporated into the decoder.

Although compression can reduce transmission time by decreasing the size of the instance document, if the description is large, transmitting the entire content description over a network can still take too much time. Therefore, only portions of the instance document may be transmitted to conserve bandwidth. In general, a content description can be modeled as a tree that is composed of a set of sub-trees or fragments. The determination of which fragments to send is application dependent.

Additionally, the content description may be dynamic in that it changes during the time the instance document is being transmitted to the receiving system. For example, if the content description describes a scene being captured by a camera, the content description changes when an object appears or disappears from the scene. Similarly, if the content description is for a television program, portions of the description, such as the broadcast time of the program, may change and such changes are transmitted to the receiving system. Any changes must be incorporated into the content description already transmitted. In general, it is more efficient to send only the changed fragments and indicate where they are to be applied/updated instead of re-transmitting the entire content description.

SUMMARY OF THE INVENTION

Updates to a content description represented as a tree are contained in a series of fragment update units. Each fragment update unit includes an update command and a navigation path, and may include a fragment payload depending on the update command. The update command is applied to a set of nodes in the tree that are selected using the navigation path. The fragment payload may contain a fragment, a fragment reference, or an attribute. The update command may be an add, delete or replace command. More than one fragment payload may be present in the fragment update unit, with each fragment payload applied to a different one of the nodes from the set selected by the navigation path.

BRIEF DESCRIPTION OF THE DRAWINGS

FIGS. 1A-D are diagrams illustrating the operation of embodiments of the invention;

FIG. 2 is diagram of a computer environment suitable for practicing the invention;

FIG. 3A is a flow diagram of a method to encode access units according to an embodiment of the invention; and FIG. 3B is a flow diagram of a method to decode access units according to an embodiment of the invention.

DETAILED DESCRIPTION OF THE INVENTION

In the following detailed description of embodiments of the invention, reference is made to the accompanying drawings in which like references indicate similar elements, and in which is shown, by way of illustration, specific embodiments in which the invention may be practiced. These embodiments are described in sufficient detail to enable those skilled in the art to practice the invention, and it is to be understood that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims.

Figure 1A:
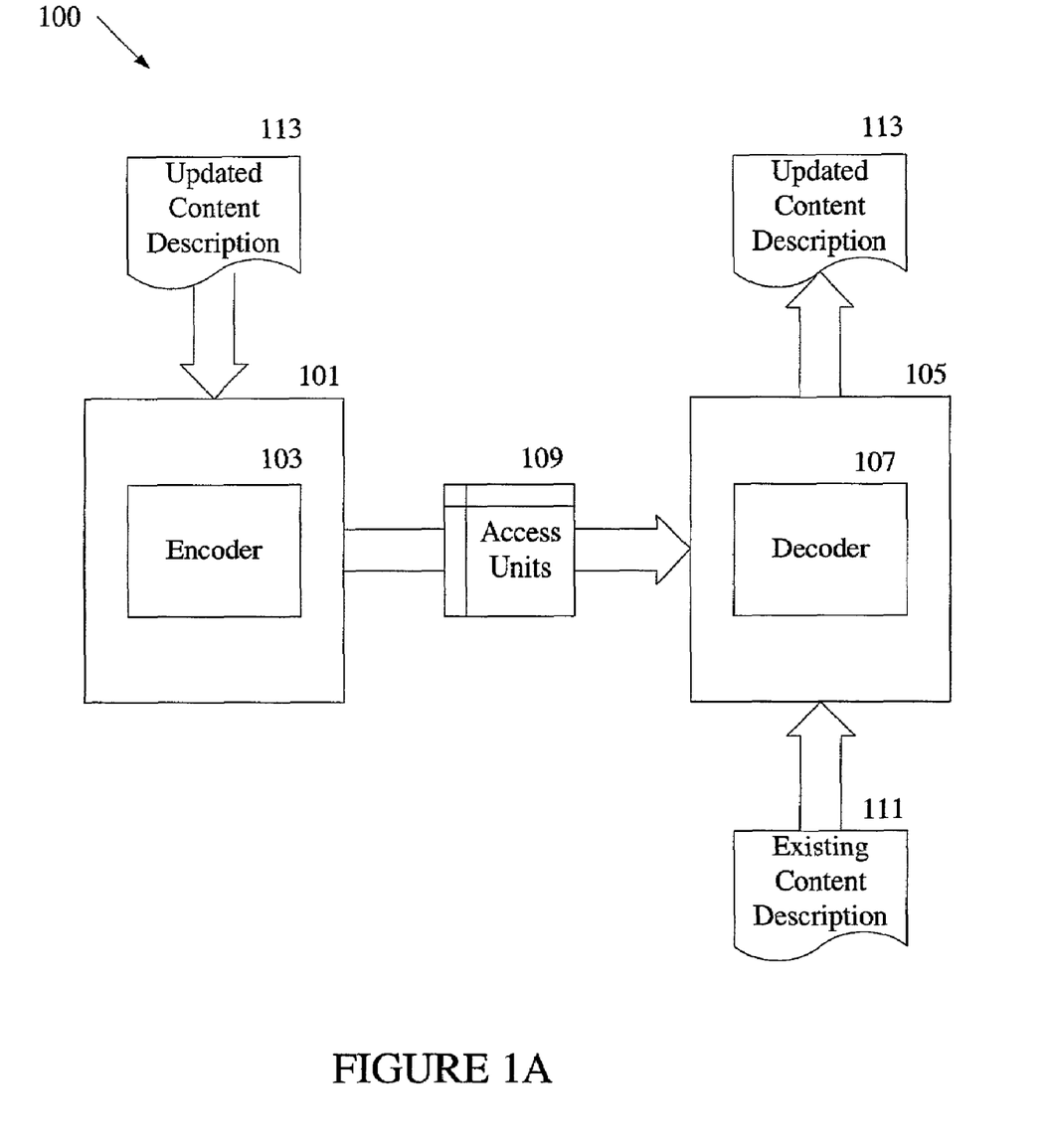

Beginning with an overview of a multimedia content description delivery system 100 as illustrated in FIG. 1A, a content description on a transmitting system may be updated by adding, deleting or replacing description fragments, i.e., descriptors and description schemes, and/or attributes within fragments. The updates are organized into packets 109, such as by encoder 103, and transmitted to a receiving system 105. A decoder 107 on the receiving system 105 updates an existing content description 111 to recreate the updated content description 113 on the receiving system 105 by applying the updates to the existing content description 111. The packets 109 are referred to herein as "access units," which is the term used by the MPEG-7 standard, but the invention is not so limited. It will be further appreciated that the invention is not limited to the particular arrangement of components illustrated in FIG. 1A. For example, one of skill in the art will immediately recognize that the transmitting system may receive the access units from another system for subsequent transmission.

Figure 1B:
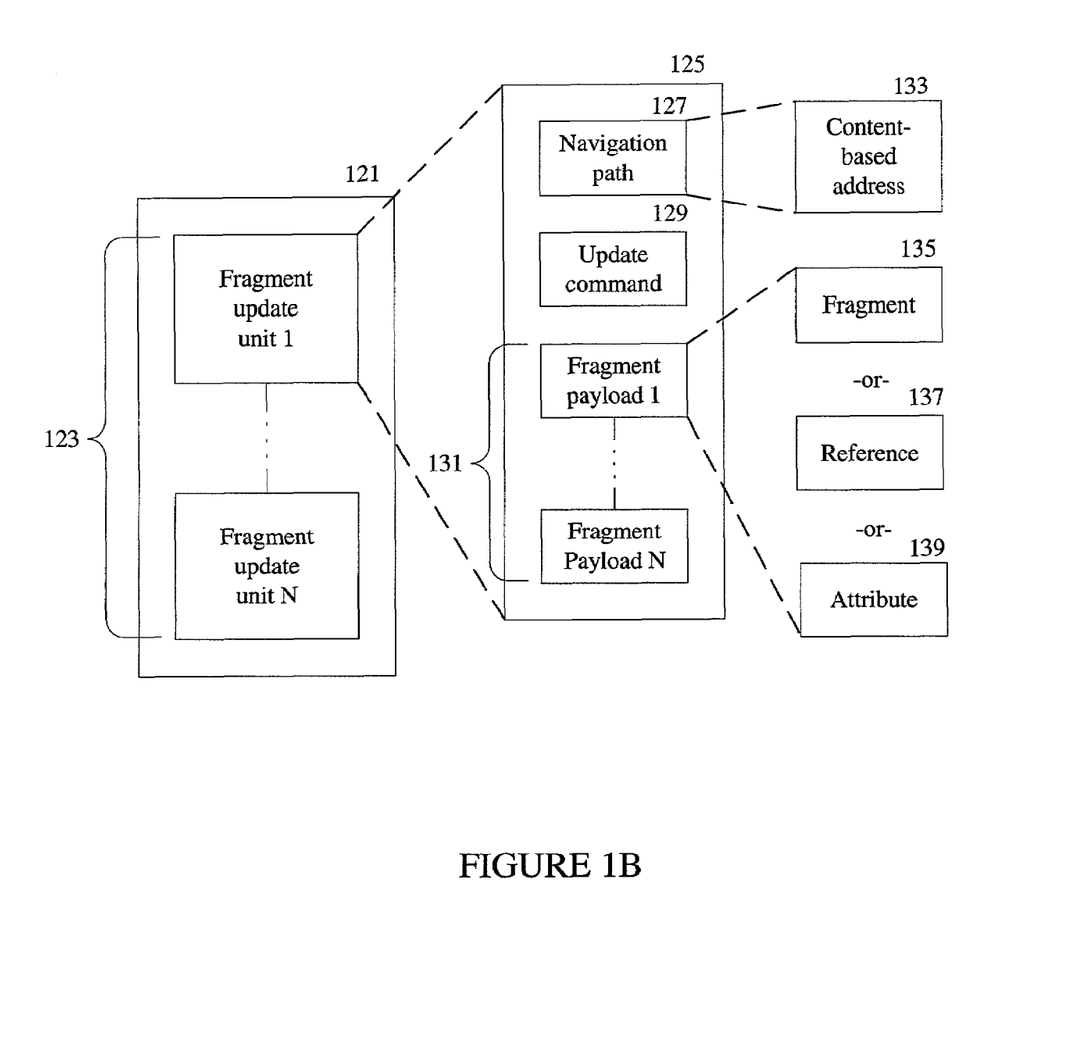

One embodiment of an access unit 121 is illustrated in FIG. 1B in which the access unit 121 contains one or more fragment update units 123, which may update multiple content description fragments (i.e. description sub-trees) using a single command. Each fragment update unit 125 contains a navigation path 127, an update command 129, and zero or more fragment payloads 131, depending on the update command 129. Each fragment payload 131 contains a fragment 135, a reference to a fragment 137, or an attribute 139 to apply to the description tree. The navigation path 127 is a content-based address 133 that directs the decoder to the appropriate locations in the description tree by specifying a path to a particular level in the tree and, optionally, a query condition for selecting a set of nodes. The update command 129 is applied to the nodes in the set of selected nodes.

Figure 1C:
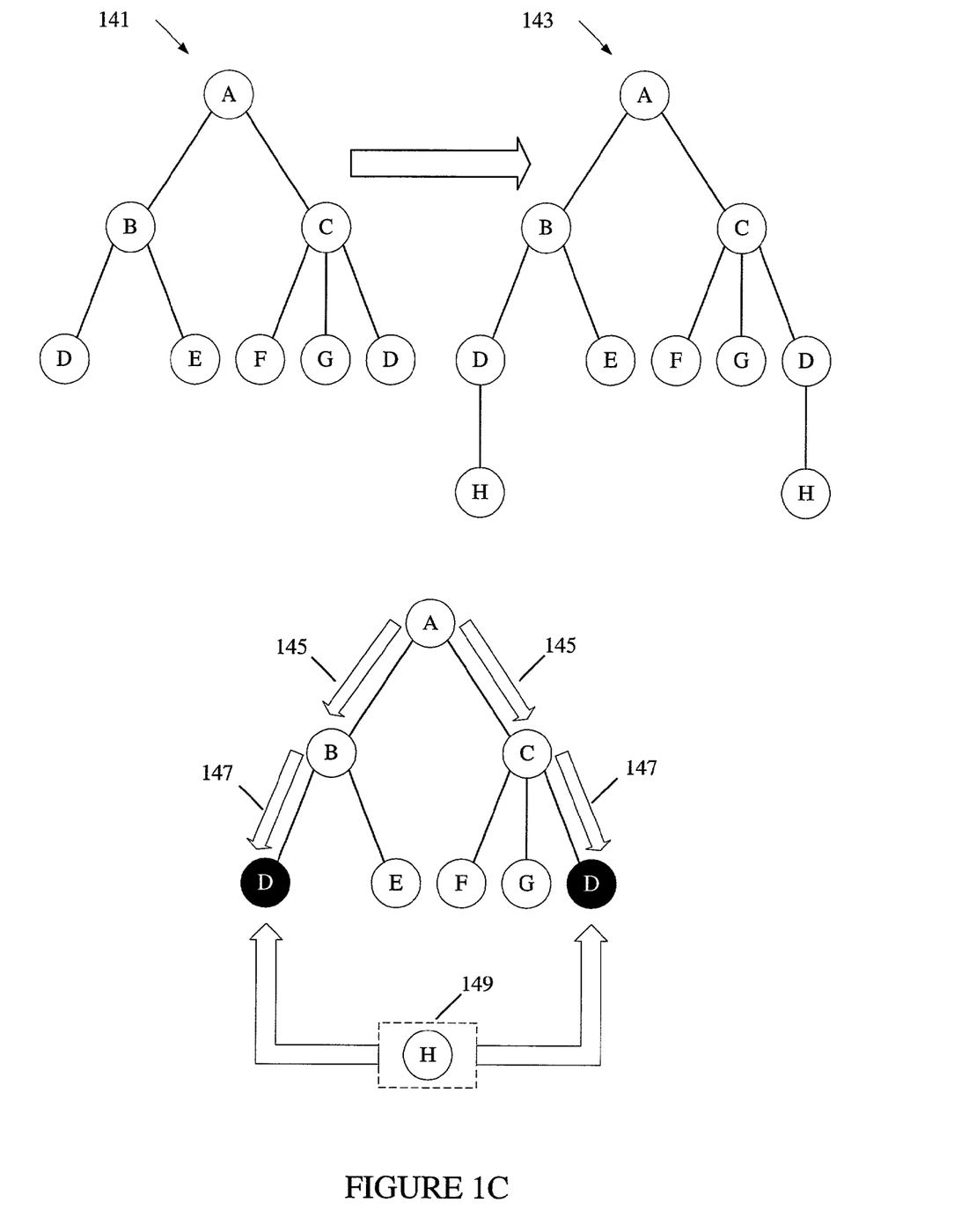
Figure 1D:
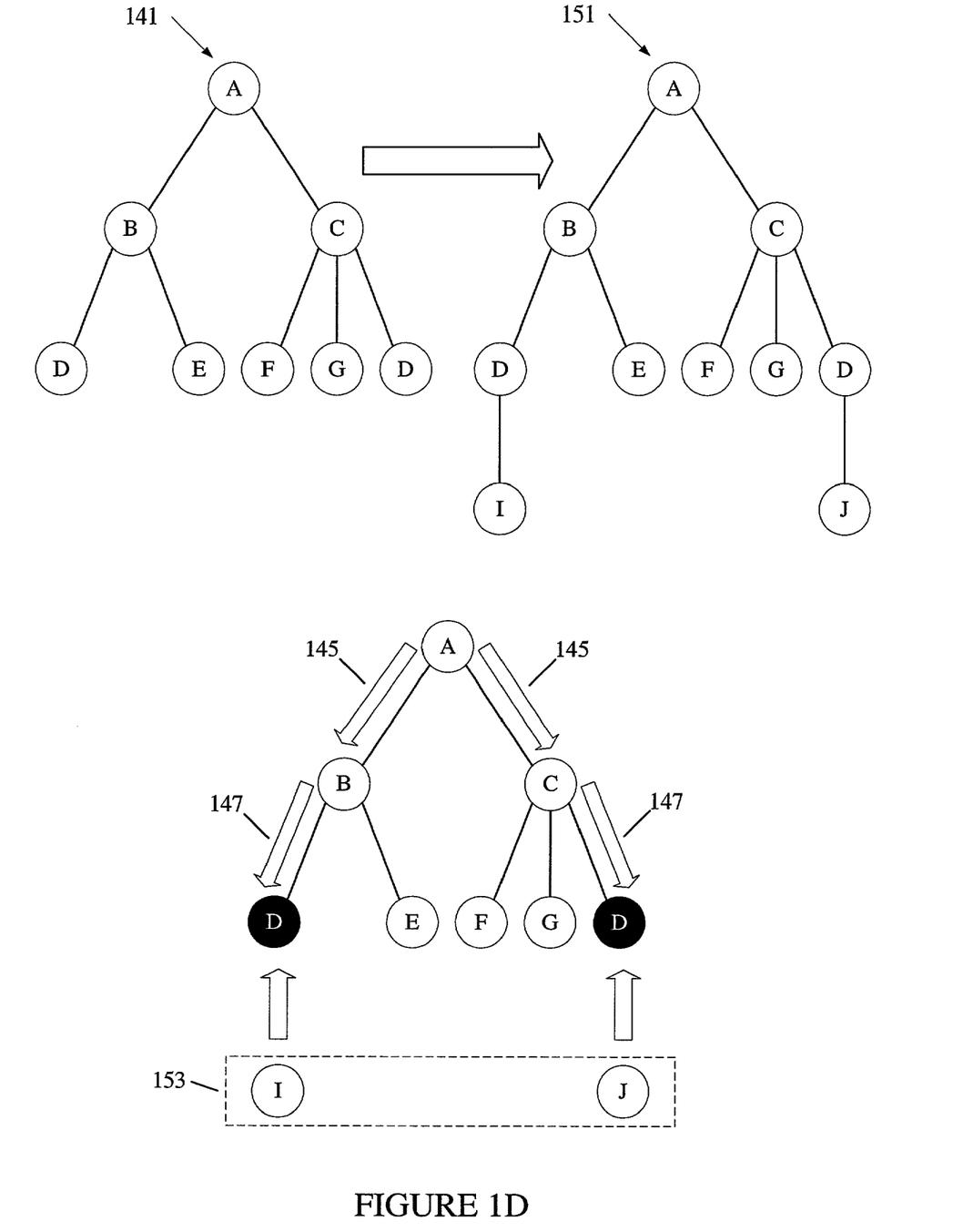

FIGS. 1C and 1D illustrate the update/addition of fragments to a description tree using a fragment update unit as shown in FIG. 1B. Although not illustrated in FIG. 1C-D, when the fragment update unit 125 is created to delete a fragment, the fragment payload section 131 is empty.

A single fragment update unit can be used to update multiple nodes with the same fragment as illustrated in FIG. 1C, in which description tree 141 is updated to match description tree 143 by adding a node H fragment to each D node. The fragment update unit contains a content-based address (illustrated as arrows 145, 147) that indicates the two D nodes in the third level in the tree 141, an update command of "add," and a fragment payload 149 containing, or identifying, the node H fragment. The decoder uses the content-based address to select the two D nodes and adds the node H fragment as a child of each D node. In one embodiment, an added fragment is always a child of the selected nodes. In an alternate embodiment, the content-based address specifies the relationship between the added fragment and the selected nodes.

A single fragment update unit can also be used to update multiple nodes with different fragments as illustrated in FIG. 1D, in which the description tree 141 is updated to match description tree 151. As described in conjunction within FIG. 1C, the fragment update unit contains an add command and a content-based address (arrows 145, 147) that points to the D nodes as the selected node set. The fragment payload 153 identified fragments for two nodes, node I and node J. The decoder applies the node I fragment to the first node in the set, and the node J fragment to the second node in the set. It is assumed that the application creating the fragment update unit has a priori knowledge about the number and order of the nodes that will be selected by the content-based address at the decoder.

In one embodiment, when the navigation path references content descriptions coded in XML, such as MPEG-7 content descriptions, the content-based address 133 is a location path expression in the XML path language (XPath). An XPath location path consists of a set of location steps that walk through nodes in a tree structure. Each step is relative to a set of context nodes specified by the previous step. A location step consists of three parts:

1. an axis that specifies the relationship in the tree between the nodes selected by the step and the context node(s), e.g., parent, child, ancestor, sibling, attribute, etc.;
2. a node test that specifies the node type of the nodes selected by the step, e.g., text, attribute, element, etc.; and
3. zero or more predicates that are used to filter the nodes selected by the step, e.g., (select all), text, @ attribute-name, order-number, etc.

For example, consider the following XML content description:

```
<doc>
    <name first="David" last="Marston"/>
    <name first="David" last="Bertoni"/>
    <name first="Donald" last="Leslie"/>
    <name first="Emily" last="Farmer"/>
    <name first="Myriam" last ="Midy"/>
    <name first="Paul" last="Dick"/>
    <name first="Scott" last="Boag"/>
    <name first="Shane" last="Curcum"/>
    <name first="Joseph" last ="Kesselman"/>
    <name first="Stephen" last="Auriemma"/>
</doc>
```

If the fragment update unit contains the following:
NavigationPath:/doc/name[@first="David"]
UpdateCommand: AddFragment
FragmentPayload: <Sex>Male</Sex> the decoder selects the nodes corresponding to David Marston and David Bertoni, and adds the fragment in the FragmentPayload to them, resulting in

```
<doc>
    <name first="David" last="Marston">
        <Sex>Male</Sex>
    </name>
    <name first="David" last="Bertoni">
        <Sex>Male</Sex>
    </name>
    <name first="Donald" last="Leslie"/>
    <name first="Emily" last="Farmer"/>
    <name first="Myriam" last ="Midy"/>
    <name first="Paul" last="Dick"/>
    <name first="Scott" last="Boag"/>
    <name first="Shane" last="Curcuru"/>
    <name first="Joseph" last ="Kesselman"/>
    <name first="Stephen" last="Auriemma"/>
</doc>
```

Different fragments can be included in the fragment payload to update the nodes differently. Assuming the XML content description above, and the same context-based address, if the FragmentPayload contained <Age>21</Age> and <Age>35</Age>, the resulting content description would be

```
<doc>
    <name first="David" last="Marston">
        <Age>21</Age>
    </name>
    <name first="David" last="Bertoni">
        <Age>35</Age>
    </name>
    <name first="Donald" last="Leslie"/>
    <name first="Emily" last="Farmer"/>
    <name first="Myriam" last ="Midy"/>
    <name first="Paul" last="Dick"/>
    <name first="Scott" last="Boag"/>
    <name first="Shane" last="Curcuru"/>
    <name first="Joseph" last ="Kesselman"/>
    <name first="Stephen" last="Auriemma"/>
</doc>
```

As illustrated in FIG. 1B, a fragment update unit 125 may also specify attributes to update. In one embodiment, attributes are treated as child nodes of the element to which they belong. The fragment payload 131 contains a single node 139, which is the value of the attribute, and the attribute nodes to update are selected using the content-based address as described above. In an alternative embodiment, the fragment update unit 125 distinguishes between fragment updates and attribute updates by including the attribute identification tag, i.e., @ attribute-id, in the fragment payload 131 for an attribute update. The payload for an add or replace command also specifies the attribute value, i.e., @ attribute-id=value. The fragment payload in a fragment update unit that deletes an attribute contains only the attribute identification tag. By placing the distinction in the fragment payload, the same content-based address and command set can be used for both fragment and attribute updates.

For example, applying the following fragment update units, which designate nodes by order number,
NavigationPath: /doc/name[6]/
UpdateCommand: DeleteFragment
FragmentPayload: @last
NavigationPath: /doc/name[4]/
UpdateCommand: AddFragment
FragmentPayload: @middle="Smith"
NavigationPath: /doc/name[3]/
UpdateCommand: ReplaceFragment
FragmentPayload: @first="Ronald"

to the content description from above, results in

```
<doc>
    <name first="David" last="Marston"/>
    <name first="David" last="Bertoni"/>
    <name first="Ronald" last="Leslie"/>
    <name first="Emily" last="Farmer" middle="Smith" />
    <name first="Myriam" last ="Midy"/>
    <name first="Paul"/>
    <name first="Scott" last="Boag"/>
    <name first="Shane" last="Curcuru"/>
    <name first="Joseph" last ="Kesselman"/>
    <name first="Stephen" last="Auriemma"/>
</doc>
```

In an alternate embodiment, the distinction between fragment and attribute updates is achieved by creating new update commands, such as AddAttribute, DeleteAttribute, and ReplaceAttribute, and by specifying the attribute identification tag as part of the content-based address, which is subsequently extracted by the decoder in applying the update.

Figure 2:
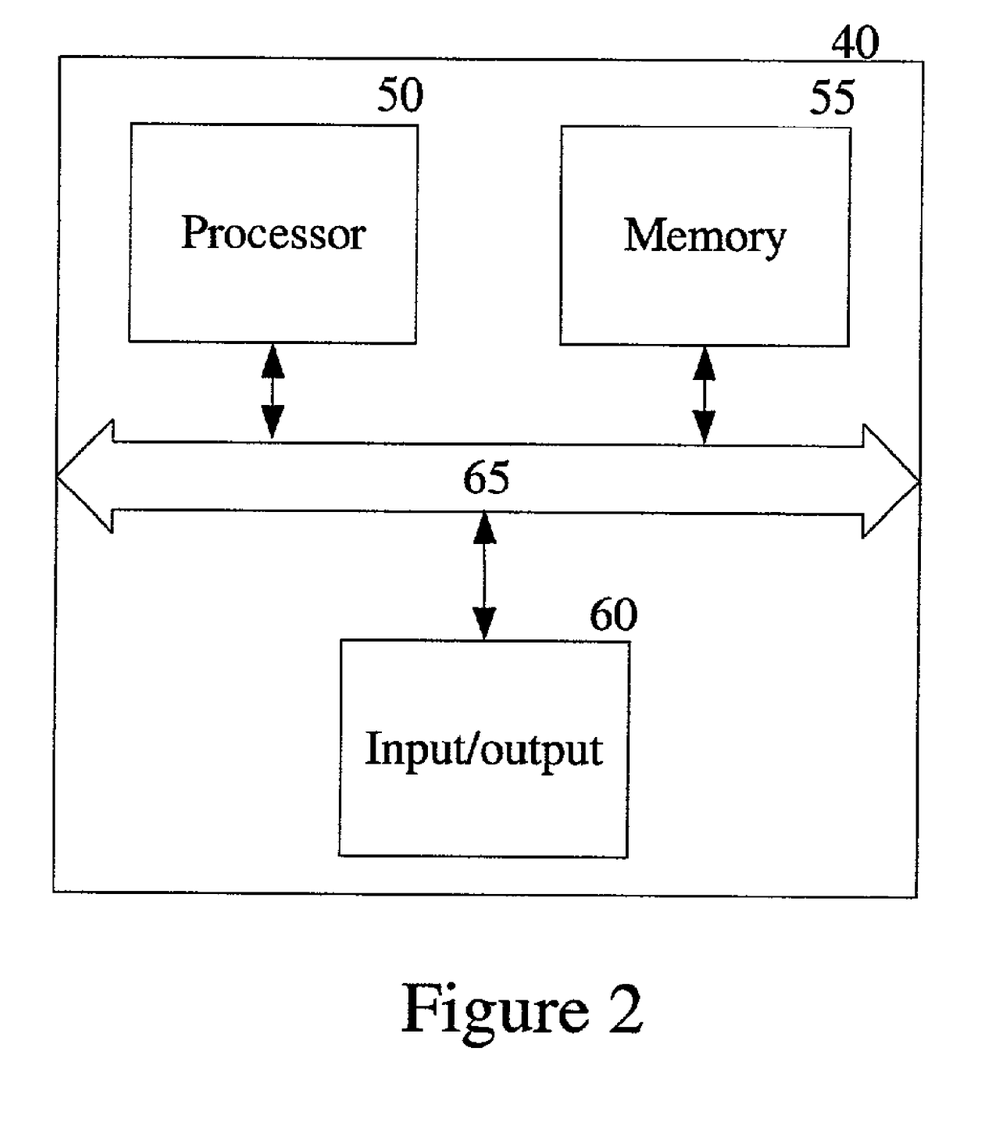

The following description of FIG. 2 is intended to provide an overview of computer hardware and other operating components suitable for implementing the invention, but is not intended to limit the applicable environments. FIG. 2 illustrates one embodiment of a computer system suitable for use as the transmitting and/or receiving system of FIG. 1A. The computer system 40 includes a processor 50, memory 55 and input/output capability 60 coupled to a system bus 65. The memory 55 is configured to store instructions which, when executed by the processor 50, perform the methods described herein. The memory 55 may also store the access units. Input/output 60 provides for the delivery and receipt of the access units. Input/output 60 also encompasses various types of computer-readable media, including any type of storage device that is accessible by the processor 50. One of skill in the art will immediately recognize that the term "computer-readable medium/media" further encompasses a carrier wave that encodes a data signal. It will also be appreciated that the system 40 is controlled by operating system software executing in memory 55. Input/output and related media 60 store the computer-executable instructions for the operating system and methods of the present invention as well as the access units. The encoder 103 and decoder 107 shown in FIG. 1A may be separate components coupled to the processor 50, or may be embodied in computer-executable instructions executed by the processor 50. In one embodiment, the computer system 40 may be part of, or coupled to, an ISP (Internet Service Provider) through input/output 60 to transmit or receive the access units over the Internet. It is readily apparent that the present invention is not limited to Internet access and Internet web-based sites; directly coupled and private networks are also contemplated.

It will be appreciated that the computer system 40 is one example of many possible computer systems that have different architectures. A typical computer system will usually include at least a processor, memory, and a bus coupling the memory to the processor. One of skill in the art will immediately appreciate that the invention can be practiced with other computer system configurations, including multiprocessor systems, minicomputers, mainframe computers, and the like. The invention can also be practiced in distributed computing environments where tasks are performed by remote processing devices that are linked through a communications network.

Figure 3A:
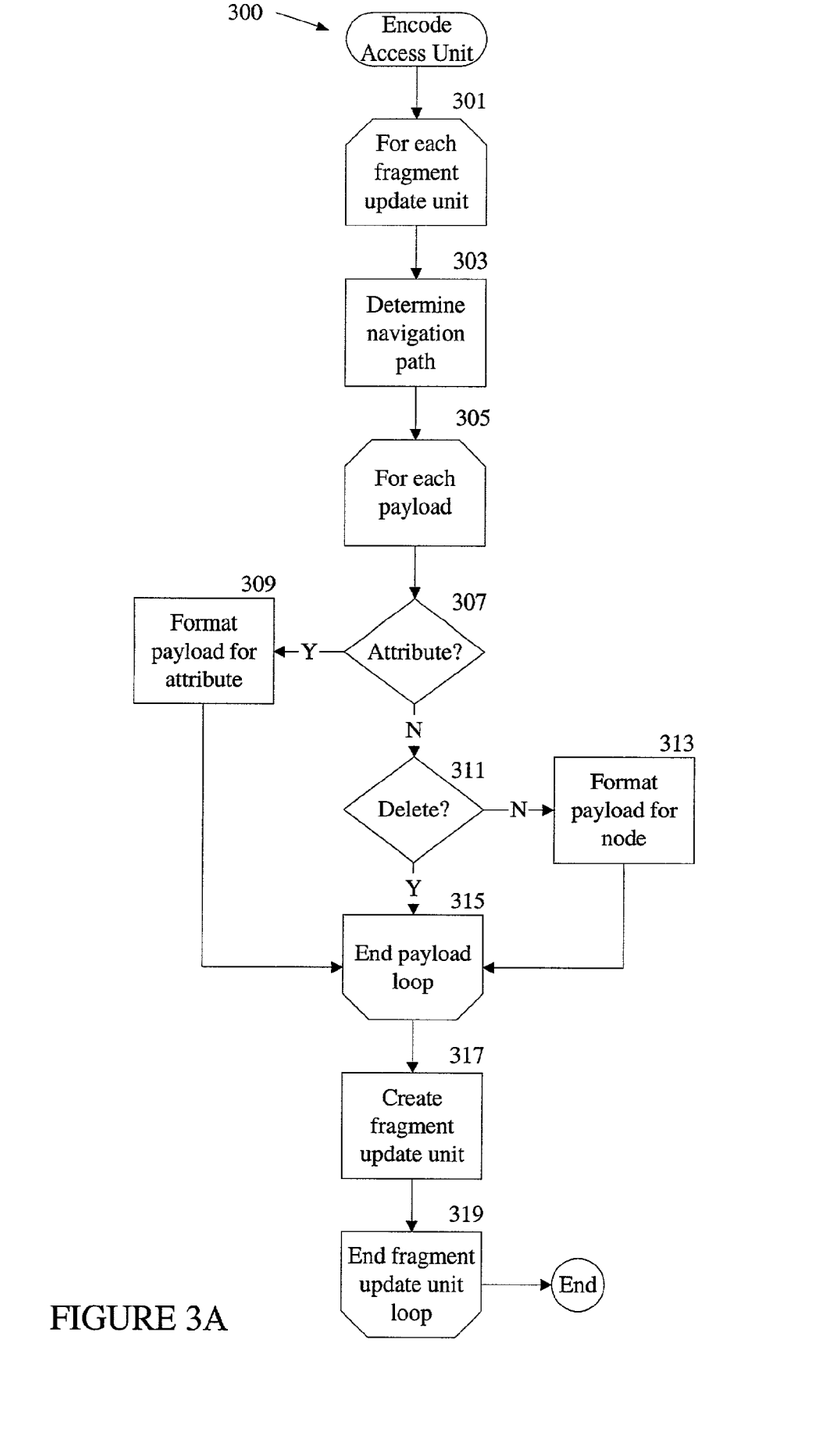
Figure 3B:
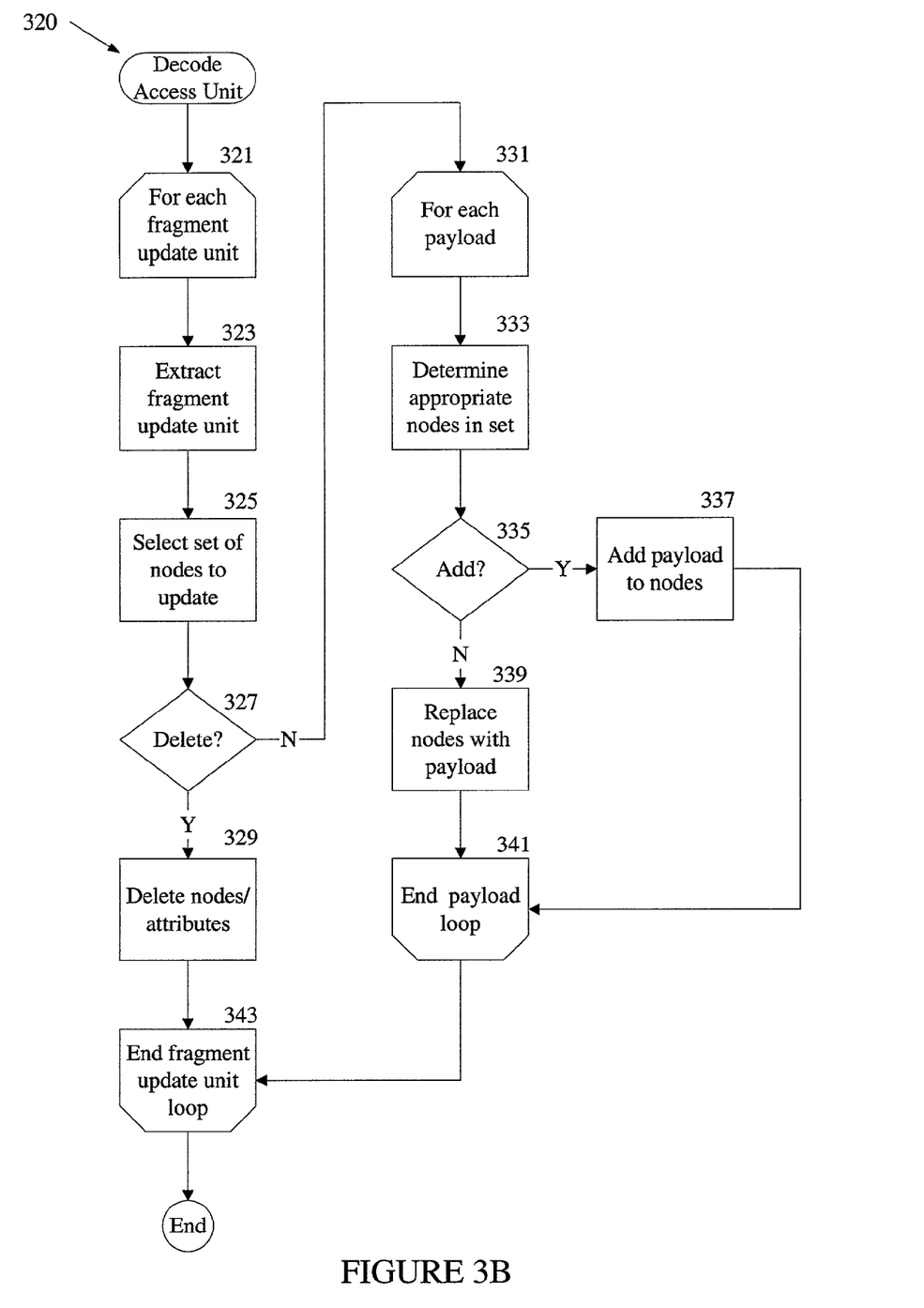

Next, the particular methods of the invention are described in terms of computer software with reference to a series of flow diagrams in FIGS. 3A-B. The methods constitute computer programs made up of computer-executable instructions illustrated as blocks (acts) in FIGS. 3A-B. Describing the methods by reference to a flow diagram enables one skilled in the art to develop such programs including such instructions to carry out the methods on suitably configured computers (the processor of the computer executing the instructions from computer-readable media, including memory). The computer-executable instructions may be written in a computer programming language or may be embodied in firmware logic. If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application, module, logic . . . ), as taking an action or causing a result. Such expressions are merely a shorthand way of saying that execution of the software by a computer causes the processor of the computer to perform an action or produce a result. It will be appreciated that more or fewer processes may be incorporated into the methods illustrated in FIGS. 3A-B without departing from the scope of the invention and that no particular order is implied by the arrangement of blocks shown and described herein.

Referring first to FIG. 3A, the acts to be performed to encode an access unit are shown. The method 300 is invoked when an application indicates updates to fragments or attributes of a content description should be disseminated to receiving systems. The method 300 may be incorporated into an encoder or operate as a separate module, and may be performed by the transmitting system or by another system that transfers the encoded access units to the transmitting system.

For each fragment update unit in the access unit, the method 300 performs the acts represented by blocks 301 until 319 for each update command to be encoded. The navigation path to the appropriate nodes is determined at block 303 and each of the fragment payloads are formatted at blocks 305 until 315. If a payload is to update an attribute (block 307), the payload is formatted with the attribute identification tag and the attribute value, if necessary (block 309). If the update is to delete a fragment (block 311), no payload is required. If the update is to add or replace a fragment, the payload is formatted to contain either the fragment or a reference to the fragment (block 313). Once all payloads for a fragment update unit have been formatted (block 315), the fragment update unit is created (block 317) containing the navigation path, the update command, and the fragment payloads, if any. When all fragment update units for the access unit have been created (block 319), the method 300 terminates.

When a receiving system receives an access unit, it invokes a decode access unit method 320. The method 320 may be executed by a decoder in the receiving system or as a separate module. When an access unit is received, each fragment update unit in the access unit is processed as illustrated by blocks 321 until 343. The fragment update unit is extracted (block 323) and the navigation path is used to select the set of nodes to update (block 325). If the command is delete (block 327), the set of nodes/attributes are deleted (block 329). For each fragment payload, the processing illustrated by blocks 331 until 341 is performed. The appropriate nodes that are to be updated with the payload are determined (block 333), i.e., the next node if there are multiple payloads. If the update command is add (block 335), the payload, either fragments or attributes, are added to the nodes (block 337). If the update command is a replace, the fragments or attributes in the payload replace the corresponding data in the nodes (block 339).

In an MPEG-7 implementation, the access unit 121 of FIG. 1B may be defined in DDL syntax as follows:

```
<element name="AccessUnit" type="mpeg7:AccessUnitType"/>
<complexType name="AccessUnitType">
   <sequence>
     <element name="FragmentUpdateUnit"
            type="mpeg7:FragmentUpdateUnitType"
            minOccurs="1" maxOccurs="unbounded"/>
     <element name="DigitalSignature" type="mpeg7:DigitalSignatureType"
            minOccurs="0" maxOccurs="1"/>
   </sequence>
   <attribute name="Order" use="default" value="seq">
     <simpleType>
       <restriction base="string">
         <enumeration value="seq"/>
         <enumeration value="par"/>
       </restriction>
     </simpleType>
   </attribute>
</complexType>.
```

The access unit is composed of a sequence of FragmentUpdateUnits, as defined below. The order attribute indicates whether the update order should be preserved between a sequence of fragment update commands, with "seq" meaning that order is to be preserved when executing the update commands, while "par" value means that that update commands may be executed in any order. DigitalSignature is used for authentication purposes and is an optional field, with its design and use left up to the user.

A FragmentUpdateUnit is the container for navigation, update command and fragment payload elements as previously described in conjunction with fragment update units 123 in FIG. 1B. These elements are used for the selection and execution of fragment update operations. An MPEG-7 DDL for a FragmentUpdateUnit according to the present invention may be

```
<complexType name="FragmentUpdateUnitType">
    <element name="Navigation" type="mpeg7:XPathType"
        minOccurs="1"/>
    <element name="UpdateCommand"
        type="mpeg7:UpdateCommandType" minOccurs="1"/>
    <element name="FragmentPayload" type="mpeg7:FragmentPayload-
Type"
        minOccurs="0" maxOccurs="unbounded"/>
</complexType>.
```

Another MPEG-7 DDL definition of FragmentUpdateUnit is

```
<complexType name="FragmentUpdateUnitType">
<sequence>
    <element name="FUCommand"
    type="mpeg7s:FragmentUpdateCommandType"/>
    <element name="FUContext" type="mpeg7s:FragmentUpdate-
ContextType"
        minOccurs="0"/>
    <element name="FUPayload" type="mpeg7s:FragmentUpdate-
PayloadType"
        minOccurs="0" />
    </sequence>
</complexType>.
```

The Navigation element is an XPath expression that is used to provide the set of nodes to update as previously described in conjunction with navigation path 127 in FIG. 1B. The MPEG-7 DDL for the UpdateCommand element may be

```
<simpleType name="UpdateCommandType">
    <restriction base="string">
        <enumeration value="AddFragment"/>
        <enumeration value="DeleteFragment"/>
        <enumeration value="ReplaceFragment"/>
        <enumeration value="Reset"/>
    </restriction>
</simpleType>.
```

An alternative MPEG-7 DDL definition of the UpdateCommand type is:

```
<simpleType name="FragmentUpdateCommandType">
    <union>
        <simpleType>
            <restriction base="string">
                <enumeration value="addNode"/>
                <enumeration value="deleteNode"/>
                <enumeration value="replaceNode"/>
                <enumeration value="reset"/>
            </restriction>
        </simpleType>
        <simpleType>
            <restriction base="string"/>
        </simpleType>
    </union>
</simpleType>.
```

The AddFragment, DeleteFragment, and ReplaceFragment commands correspond to the add, delete and replace commands previously described in conjunction with update command 129 in FIG. 1B. The Reset command sets the context node to the node pointed by the navigation in the description tree generated by a base access unit during an initialization process. The MPEG-7 DDL for a FragmentPayload element according to the present invention may be

```
<complexType name="FragmentPayloadType">
    <complexContent>
        <choice>
            <element name="Payload" type="mpeg7:Mpeg7RootType">
            <element name="Reference" type="mpeg7:ReferenceType"/>
        <attribute name="PartialInstantiation" type="boolean"
            use="default" value="false"/>
    </complexContent>
</complexType>.
```

An alternative but functionally equivalent DDL definition is:

```
<complexType name="FragmentUpdatePayloadType">
    <sequence>
        <any processContents="skip" minOccurs="0"/>
    </sequence>
    <attribute name="hasDeferredNodes" type="boolean"
        use="required" default="false"/>
    <anyAttribute namespace="##other" processContents="skip"
        use="optional"/>
</complexType>.
```

The Payload element contains the value of an updated description fragment or an attribute value as previously described in conjunction with fragment 135 or attribute 139 in FIG. 1B. The Reference element contains a pointer to a fragment that contains the value of the updated description fragment as previously described in conjunction with reference 137. The description fragment identified by Payload or Reference is either a complete description or a single descriptor or description instance. When true, the PartialInstantiation attribute (or the hasDeferredNodes attribute in the alternate definition) indicates that one or several elements of the fragment identified by Payload or Reference have empty content.

A multimedia content description delivery system that disseminates and applies updates to content descriptions has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

The terminology used in this application with respect to MPEG-7 is meant to include all environments that provide content descriptions. Therefore, it is manifestly intended that this invention be limited only by the following claims and equivalents thereof.

What is claimed is:

1. A computerized method of updating a multimedia content description represented as a tree comprising:

receiving, by a decoder, a fragment update unit for the multimedia content description, the fragment update unit comprising a navigation path, a fragment payload, and an update command, wherein the navigation path is a context-based address that selects a set of nodes based on their content;

selecting a set of nodes in the tree using the navigation path;

selecting the update command;

formatting the fragment payload if required by the update command;

calculating the navigation path;

creating the fragment update unit from the navigation path, the update command, and the fragment payload if required; and applying the update command to the selected set of nodes, wherein formatting the fragment payload comprises including an attribute identification tag when an attribute is to be updated and wherein the fragment payload is not required when a fragment is to be deleted.

2. The computerized method of claim 1, wherein the content-based address is expressed as an XML XPath location path when the multimedia content description is coded in XML (extensible markup language).

3. The computerized method of claim 1, wherein the fragment update unit comprises a fragment payload and applying the update command comprises updating the set of nodes in the tree with the fragment payload.

4. The computerized method of claim 3, wherein the fragment update unit further comprises a plurality of fragment payloads and updating the set of nodes comprises updating each one of the set of nodes with a different one of the plurality of fragment payloads in a predetermined order.

5. The computerized method of claim 4, wherein the predetermined order is determined by an ordering of all nodes in the tree.

6. The computerized method of claim 5, wherein the ordering of all nodes in the tree is selected from the group consisting of pre-order, post-order and infix order.

7. The computerized method of claim 3, wherein the fragment payload is selected from the group consisting of a fragment, a fragment reference, and an attribute.

8. The computerized method of claim 1, wherein the update command is selected from the group consisting of add, delete, and replace commands.

9. The computerized method of claim 1 further comprising:

sending the fragment update unit as pan of an access unit.

10. A computer-readable storage medium having executable instructions to cause a computer to execute a method comprising:

receiving a fragment update unit for a multimedia content description represented as a tree, the fragment update unit comprising a navigation path, a fragment payload, and an update command, wherein the navigation path is a context-based address that selects a set of nodes based on their content;

selecting a set of nodes in the tree using the navigation path;

selecting the update command;

formatting the fragment payload if required by the update command;

calculating the navigation path;

creating the fragment update unit from the navigation path, the update command, and the fragment payload if required; and applying the update command to the selected set of nodes, wherein formatting the fragment payload comprises including an attribute identification tag when an attribute is to be updated and wherein the fragment payload is not required when a fragment is to be deleted.

11. The computer-readable storage medium of claim 10, wherein the content-based address is expressed as an XML XPath location path when the multimedia content description is coded in XML (extensible markup language).

12. The computer-readable storage medium of claim 10, wherein the fragment update unit comprises a fragment payload and applying the update command comprises updating the set of nodes in the tree with the fragment payload.

13. The computer-readable storage medium of claim 12, wherein the fragment update unit further comprises a plurality of fragment payloads and updating the set of nodes comprises updating each one of the set of nodes with a different one of the plurality of fragment payloads in a predetermined order.

14. The computer-readable storage medium of claim 13, wherein the predetermined order is determined by an ordering of all nodes in the tree.

15. The computer-readable storage medium of claim 14, wherein the ordering of all nodes in the tree is selected from the group consisting of pre-order, post-order and infix order.

16. The computer-readable storage medium of claim 12, wherein the fragment payload is selected from the group consisting of a fragment, a fragment reference, and an attribute.

17. The computer-readable storage medium of claim 10, wherein the update command is selected from the group consisting of add, delete, and replace commands.

18. The computer-readable storage medium of claim 10, wherein the method further comprises:

sending the fragment update unit as pan of an access unit.

19. A system for updating a multimedia content description represented as a tree comprising:

a processor coupled to a bus;

a memory coupled to the processor though the bus;

a communications interface coupled to the processor though the bus, and further coupled to a communications medium; and a decode process executed by the processor from the memory to cause the processor to:

receive, though the communications interface, a fragment update unit for the multimedia content description, wherein the fragment update unit comprises a navigation path, a fragment payload, and an update command, wherein the navigation path is a context-based address that selects a set of nodes based on their content;

select a set of nodes in the tree using the navigation path;

select the update command;

format the fragment payload if required by the update command;

calculate the navigation path;

create the fragment update unit from the navigation path, the update command, and the fragment payload if required; and apply the update command to the selected set of nodes, wherein formatting the fragment payload comprises including an attribute identification tag when an attribute is to be updated and wherein the fragment payload is not required when a fragment is to be deleted.

20. The system of claim 19, wherein the fragment update unit comprises a fragment payload and the decode process further causes the processor to update the set of nodes in the tree with the fragment payload when applying the update command.

21. The system of claim 20, wherein the fragment update unit further comprises a plurality of fragment payloads and the decode process further causes the processor to update each one of the set of nodes with a different one of the plurality of fragment payloads in a predetermined order to update the set of nodes.

22. The system of claim 20, wherein the fragment payload is selected from the group consisting of a fragment, a fragment reference, and an attribute.

23. The system of claim 19, wherein the update command is selected from the group consisting of add, delete, and replace commands.

\* \* \* \* \*